United States Patent [19]
Farkas

[11] Patent Number: 5,709,892
[45] Date of Patent: Jan. 20, 1998

[54] SYSTEM FOR PRODUCING A FOAMED ISOCYANATE-BASED POLYMER

[75] Inventor: Paul V. Farkas, Willowdale, Canada

[73] Assignee: Woodbridge Foam Corporation, Willowdale, Canada

[21] Appl. No.: 620,611

[22] Filed: Mar. 22, 1996

Related U.S. Application Data

[62] Division of Ser. No. 278,549, Jul. 21, 1994, Pat. No. 5,523,330.

[51] Int. Cl.⁶ .................................................. B29C 31/06
[52] U.S. Cl. ............................................ 425/4 R; 425/256
[58] Field of Search ............................... 425/4 R, 817 R, 425/256, 447

[56] References Cited

U.S. PATENT DOCUMENTS

| | | | |
|---|---|---|---|
| 3,588,953 | 6/1971 | Reuter et al. | 425/4 R |
| 4,242,306 | 12/1980 | Kreuer et al. | 425/817 R |
| 4,308,226 | 12/1981 | Wingard | 425/817 R |
| 4,399,105 | 8/1983 | Tilgner et al. | 425/4 R |
| 5,084,486 | 1/1992 | Patten et al. | 521/126 |
| 5,451,376 | 9/1995 | Proksa et al. | 425/4 R |

FOREIGN PATENT DOCUMENTS 1-198313  8/1989  Japan ........................... 425/4 R

*Primary Examiner*—Robert Davis
*Attorney, Agent, or Firm*—Fitzpatrick, Cella, Harper & Scinto

[57] ABSTRACT

A system for producing a foamed isocyanate-based polymer includes a base line comprising a first mixing device operable in a first mode and a second mode and having an active hydrogen-containing compound input and an isocyanate input. A complementary line is provided and includes a second mixing device having a filler material input. In the first mode, the first mixing device receives a feed from the active hydrogen-containing compound input and the isocyanate input, mixes the feed to produce a first foamable polymeric composition, and dispenses the first foamable polymeric composition into a first mold. In the second mold, the first mixing device returns the feed, without mixing, from the active hydrogen-containing compound input and the isocyanate input to the second mixing device which mixes the feed with feed from the filler material input to produce a second foamable polymeric composition, and dispenses the second foamable polymeric composition in a second mold.

13 Claims, 1 Drawing Sheet

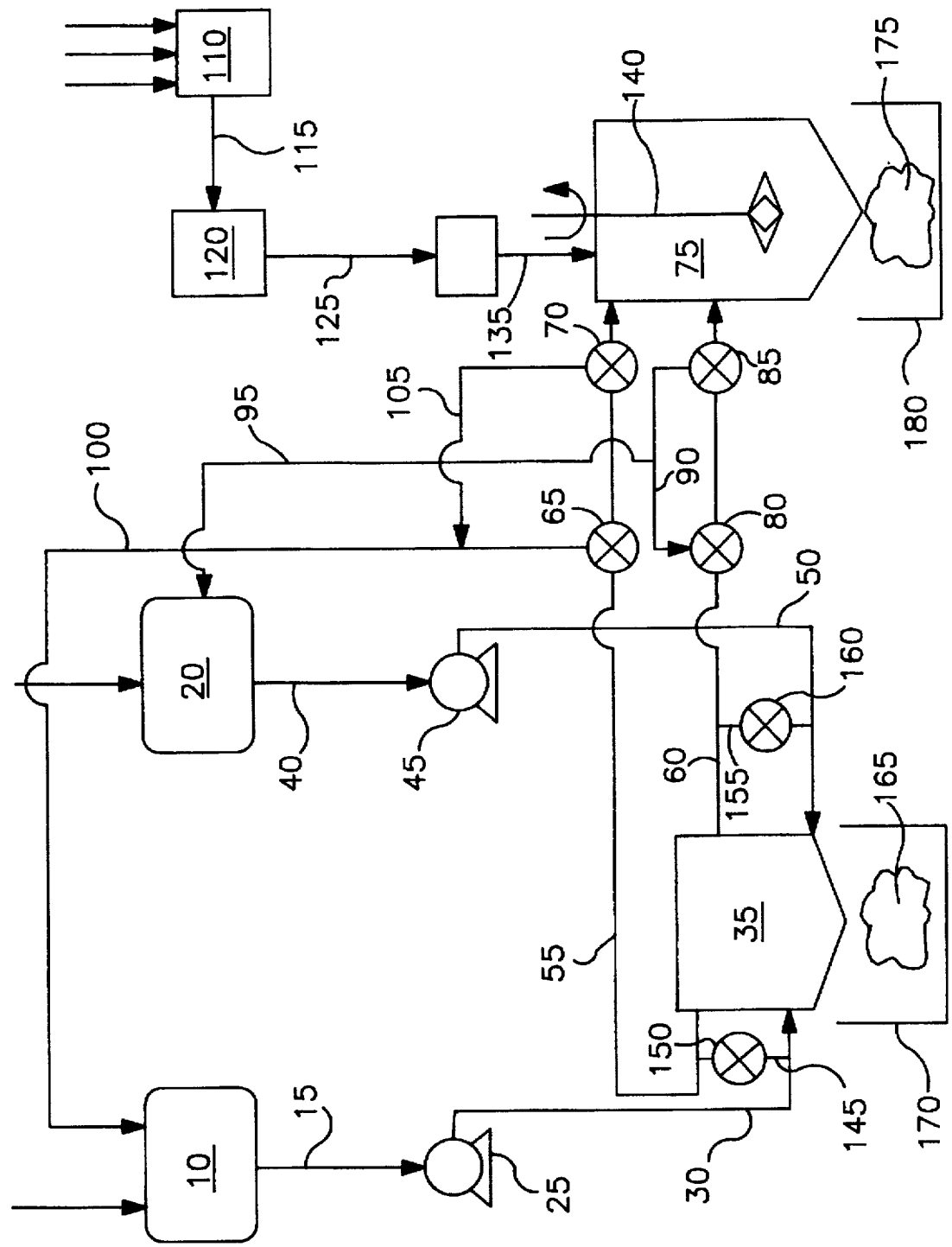

SYSTEM FOR PRODUCING A FOAMED ISOCYANATE-BASED POLYMER

This application is a division of application Ser. No. 08/278,549 filed Jul. 21, 1994, now U.S. Pat. No. 5,523,330.

BACKGROUND OF THE INVENTION

1. Field of the Invention

The present invention relates to a process for producing a foamed polymer. More particularly, the present invention relates to a process for producing a foamed isocyanate-based (e.g. polyurethane, polyurea, polyisocyanurate, etc.) polymer.

2. Description of the Prior Art

Isocyanate-based polymers are known in the art. Generally, those of skill in the art understand isocyanate-based polymers to be polyurethanes, polyureas, polyisocyanurates and mixtures thereof.

It is also known in the art to produce foamed isocyanate-based polymers. Indeed, one of the advantages of isocyanate-based polymers compared to other polymer systems is that polymerization and foaming can occur in situ. This results in the ability to mold the polymer while it is forming and expanding.

One of the conventional ways to produce a polyurethane foam is known as the "one-shot" technique. In this technique the isocyanate, a suitable polyol, a catalyst, water (which acts as a reactive blowing agent and can optionally be supplemented with one or more blowing agents) and other additives are mixed together at once using, for example, an impingement (i.e. high pressure) mixer. Generally, if one were to produce a polyurea, the polyol would be replaced with a suitable polyamine. A polyisocyanurate may result from cyclotrimerization of the isocyanate component. Urethane modified polyureas or polyisocyanurates are known in the art. In either scenario, the reactants would be intimately mixed very quickly using a suitable mixer.

Another technique for producing foamed isocyanate-based polymers is known as the "prepolymer" technique. In this technique, a prepolymer is produced by reacting polyol and isocyanate (in the case of a polyurethane) in an inert atmosphere to form a liquid polymer terminated with iso-cyanate groups. To produce the foamed polymer, the pre-polymer is thoroughly mixed with a lower molecular weight polyol (in the case of producing a polyurethane) or a polyamine (in the case of producing a modified polyurea) in the presence of a curing agent and other additives, as needed.

Regardless of the technique used, it is known in the art to include a filler material in the reaction mixture. Conventionally, filler materials have been introduced into foamed polymers by loading the filler material into one or both of the liquid isocyanate and the liquid active hydrogen-containing compound (i.e. the polyol in the case of polyurethane, the polyamine in the case of polyurea, etc.).

The nature and relative amounts of filler materials used in the reaction mixture can vary, to a certain extent, depending on the desired physical properties of the foamed polymer product, and limitations imposed by mixing techniques, the stability of the system and equipment imposed limitations (e.g. due to the particle size of the filler material being incompatible with narrow passages, orifices and the like of the equipment).

Typically, when it is desired to lead the foamed polymer with a filler material, there are limitations on the process resulting from the increase in the viscosity of the reaction mixture as polymerization and foaming proceed. Additional limitations result from the difficulties encountered in achieving substantially complete wetting-out of filler materials in the case where all ingredients of the reaction mixture (including the filler material) are mixed in one step in a suitable mix head (i.e. the "one-shot" technique).

A particular difficulty is encountered in the situation where the nature and surface structure of the filler material renders it selectively compatible with some but not all of the ingredients in the reaction mixture. The if, suit of this is that, regardless of whether adequate mixing of ingredients is achieved, there is an imbalance in the physical allocation of the filler material in the foamed polymer product with the filler material essentially agglomerating. This results in non-uniform physical properties in the foamed product. A secondary effect is the relative (and localized) withdrawal of one or more components of the homogeneous, liquid reactant system which may cause catastrophic foam property alterations.

When a filler material is added to any reaction mixture used to produce a foamed isocyanate-based polymer, it is desirable during the process to achieve both (i) uniform distribution of the filter material throughout the polymer matrix, and (ii) intimate contact (both chemical and physical) between the filler material and the isocyanate and active hydrogen-containing compound. The reason for this is that the desired product is a polymer which is cellular in nature and the cells should not be significantly disrupted by the presence of the filler material. The result of not achieving both (i) and (ii) above can cause uncontrolled physical property variations in the resulting foamed product due to an uneven distribution of the filler material. This is particularly a problem in the case when the individual particles of filler material am not separated from each other and the resulting foamed product contains lumps of either "dry" or "wetted" and agglomerated filler material particles.

Attempts have been made to overcome these problems by addition of the filler material to the reaction mixture in specially designed low pressure mixing heads. These mixing heads essentially endeavor to achieve both (i) and (ii) in a single step. While these mixing heads provide for adequate mixing of the filler material and the reaction mixture, they may necessitate alteration of the chemical composition in order to produce an acceptable foam with a high loading of filler. Therefore, it is not typically possible to obtain high loadings of filler material due to the fact that the mixing heads do not provide uniform distribution of the filler material simultaneously with the required intimate mixing (at the molecular level) of the main chemical reactants. The reason for this is that, as the polycondensation reaction proceeds, the viscosity of the reaction mixture increases resulting in a reduction in the ability to achieve (i) and (ii) above, and the presence of substantial amounts of filler may cause energy loss of the reacting system (i.e. a heat sink effect). Practically, this translates into an inability to achieve filler loading levels of greater than about 17–30% by weight of the polymer reaction mixture without adversely affecting the physical properties of the final foamed polymer product. Furthermore, if the efficiency of mixing the reactants and filler material is inadequate, a separation effect of the filler material (by particle size) is likely to occur resulting in an uneven particle size in the cross-section of the foam mass.

In copending United States patent applications Ser. No. 08/007,991 (filed Jan. 22, 1993) now abandoned and Ser. No. 08/074,966 (filed Jun. 11, 1993) now U.S. Pat. No. 5,432,204, the contents of each of which are incorporated herein by reference, there is disclosed a foamed isocyanate-based polymer containing a filler material, the filler material being present at a level greater than 30% by weight of the polymer and having a specific gravity of less than about 2.0 with proviso that the filler material is not melamine. A process for producing the foamed isocyanate-based polymer is also disclosed. The process comprises the steps of: providing a first mixture comprising water, a catalyst and a filler material, the filler material being wetted by the water and the catalyst; providing a second mixture comprising an isocyanate and an active hydrogen-containing compound; mixing the first mixture and the second mixture to provide a reaction mixture; and allowing the reaction mixture to expand to produce the foamed isocyanate-based polymer. An important aspect of the process is the provision of a second mixture comprising the isocyanate and the active hydrogen-containing compound substantially free of any catalysts or water so that gelling thereof is retarded and no foaming can occur. This results in a second mixture which is a liquid having a viscosity sufficiently low that it may be handled relatively easily using conventional equipment.

While the process described in the '991 and '966 applications is very useful and versatile, there can exist difficulties, depending on factors such as the nature of the filler material and the like, associated with adapting the process into a commercial operation. A principal difficulty is the requirement to have very accurate metering of the filler material. This is required since the filler material is acting as a carrier for the catalyst and water which serve to initiate polymerization and foaming, respectively, of the reaction system. As is known in the an of isocyanate-based foams, the quality of the foam is dictated, at least in part, by ensuring that a prescribed amount of catalyst and water is used in the reaction system. In producing a non-filled isocyanate-based foam, these components would conventionally be dispersed in one of the liquid reactants thereby facilitating metering thereof. By removing the catalyst and water from the liquid reactants and using them to coat or size the filler material, metering of the catalyst and water becomes dependent on accurately metering a solids stream comprising the filler material. Generally, accurate metering (as required by the specific system being metered) of a solids stream is more difficult to achieve than accurate metering of a liquids stream.

In light of these difficulties, it would be advantageous to have a process for producing a foamed isocyanate-based polymer which is relatively simple, can utilize a large variety of filler materials and allows for the introduction of substantially large amounts of filler materials. It would be especially advantageous if such a process (i) could be adapted to utilize filler materials based on recycled isocyanate-based foams or elastomers or other post-consumer and post-user products (e.g. tires), and (ii) was not limited by the particle size of the filler material. Further, it would be especially advantageous if the process was less dependent on the ability to accurately meter the filler material. Still further, it would be advantageous if the process could be relatively easily switched from making a filled faom to making an unfilled foam, and vice versa.

SUMMARY OF THE INVENTION

It is an object of the present invention to provide a novel process which obviates or mitigates one or more of the above-identified deficiencies of the prior art.

It is another object of the present invention to provide a process which allows for production of an isocyanate-based foamed polymer having a substantially high level of filler material incorporated therein.

It is yet another object of the present invention to provide a process which simplifies metering of the filler material.

Accordingly, in one of its aspects, the present invention provides a process for producing a foamed isocyanate-based polymer based on an amount of water and an amount of catalyst, the process comprising the steps of:

providing a first stream comprising a particulate, non-cellular filler material surrounded by a mixture comprising less than 100% by weight of the amount of water and less than 100% by weight of the amount catalyst;

providing a second stream comprising an active hydrogen-containing compound and the remainder of the amount of water and the amount of catalyst;

providing a third stream comprising an isocyanate;

feeding each of the first stream, the second stream and the third stream independently of one another to a mixing device;

mixing the first stream, the second stream and the third stream in the mixing device to produce a reaction mixture; and allowing the reaction mixture to expand to produce the foamed isocyanate-based polymer.

In another of its aspects, the present invention provides a system for producing a foamed isocyanate-based polymer, the system comprising a base line and a complementary line, the base line comprising a first mixing device operable in a first mode and a second mode and having an active hydrogen-containing compound input and an isocyanate input, the complementary line comprising a second mixing device having a filler material input, wherein in the first mode, the first mixing device receives a feed from the active hydrogen-containing compound input and the isocyanate input, mixes the feed to produce a first foamable polymeric composition and dispenses the first foamable polymeric composition in a first mold, and in the second mode, the first mixing device returns the feed, without mixing thereof, from the active hydrogen-containing compound input and the isocyanate input to the second mixing device which mixes the feed with feed from the filler material input to produce a second foamable polymeric composition and dispenses the second foamable polymeric composition in a second mold.

As used throughout this specification, the term "isocyanate-based polymer" is intended to mean, inter alia, polyurethane, polyurea and polyisocyanurate.

As is known in the art, the production of a foamed isocyanate-based polymer requires calculation or design of the total or theoretical amount of water and catalyst(s) necessary to produce the foam. Thus, for a given formulation, the amount of water and catalyst(s) to be used is known prior to conducting the process. It has been surprisingly and unexpectedly discovered that a useful filled, foamed isocyanate-based polymer can be produced if the particulate, non-cellular filler material is surrounded by a mixture comprising less than 100% by weight of the required amount of water and less than 100% weight of the required amount of catalyst(s). The remaining amount of the water and catalyst(s) can be dispersed in the active hydrogen-containing compound. Thus, by reducing the amount of water and catalyst(s) associated with the filler material prior to the process, the requirement of accurate metering of the filler material is mitigated. This results in simplified quality control of the overall process while enabling the production of a useful filled, foamed isocyanate-based polymer having a substantially uniform distribution of the filler material therein while maintaining a desirable balance of physical properties, even at relatively high levels of filler material.

As will be appreciated by those of skill in the art, the precise split of the water and catalyst between the first stream and the second stream will depend on the nature of the foam being produced. Generally, the first stream will comprise a particulate, non-cellular filler material surrounded by a mixture comprising: (i) less than 100%, preferably from about 1% to about 99%, more preferably from about 5% to about 70%, even more preferably from about 5% to about 60%, most preferably from about 5% to about 50%, by weight of the required amount of water; and (ii) less than 100%, preferably from about 1% to about 99%, more preferably from about 10% to about 90%, even more preferably from about 20% to about 80%, most preferably from about 35% to about 65%, by weight of the required amount of catalyst. The remaining amount of water and catalyst in each preferred embodiment is dispersed in the second stream comprising the active hydrogen-containing compound.

An aspect of this invention relates to a process for producing a foamed isocyanate-based polymer which has an unusually high level of filler material. Filler material loading levels as high as 70% by weight based on the weight of the final foamed polymer are contemplated. Preferably, the loading of the filler material is in the range of from about 30% to 70% by weight, more preferably from about 30% to about 60% by weight, even more preferably from about 30% to about 50% by weight, most preferably from about 30 to about 45% by weight, based on the weight of the final foamed polymer. Preferably, the specific gravity of the filler material for use in the present process is in the range of less than about 2.0, preferably in the range of from about 0.02 to about 1.5. Non-limiting examples of suitable such filler materials include: ground polymer (filled or unfilled), ground sheet molding compound, ground reaction injection molded (RIM) elastomer, ground reinforced reaction injection molded (RRIM) elastomer, ground whole tire or a portion thereof and ground isocyanate-based polymer foam (foam powder).

BRIEF DESCRIPTION OF THE DRAWING

Embodiments of the present invention will be described with reference to the accompanying drawing in which the FIGURE depicts a schematic of a preferred embodiment of the present process.

DETAILED DESCRIPTION OF THE PREFERRED EMBODIMENTS

The present invention is related to a process for the production of a foamed isocyanate-based polymer. Preferably, the isocyanate-based polymer is selected from the group comprising polyurethane, polyurea, polyisocyanurate, urea-modified polyurethane, urethane-modified polyurea, urethane-modified polyisocyanurate and urea-modified polyisocyanurate. As is known in the art, the term "modified", when used in conjunction with a polyurethane, polyurea or polyisocyanurate means that up to 50% of the polymer backbone forming linkages have been substituted.

The initial steps in the present process comprise the provision of a first stream, a second stream and a third stream.

The first stream comprises a particulate, non-cellular filler material surrounded by a mixture comprising less than 100% by weight of the amount of water and less than 100% by weight of the amount catalyst. As discussed hereinabove, the amount of water and catalyst to be used in the present process is initially designed based on the remainder of the formulation.

The first steam is then prepared on the basis that the particulate, non-cellular filler material is surrounded by a mixture comprising a fraction (i.e. less than 100% by weight) of the amount of each of the water and the catalyst needed based on the initial design.

As is known in the art water can be used as a reactive blowing agent in the production of foamed isocyanate-based polymers. Specifically, water reacts with the isocyanate forming carbon dioxide which acts as the effective blowing agent in the final foamed polymer product. Optionally, blowing agents may be used in conjunction with water.

The catalyst used in the first stream is a compound capable of catalyzing the polymerization reaction. Such catalysts are known, and the choice and concentration thereof is within the purview of a person skilled in the art. See for example U.S. Pat. Nos. 4,296,213 and 4,518,778, the contents of each of which is incorporated herein by reference. Non-limiting examples of suitable catalysts include tertiary amines and/or organometallic compounds. Additionally, as is known in the art, when the objective is to produce an isocyanurate, a Lewis acid must be used u the catalyst, either alone or in conjunction with other catalysts. Of course it will be understood by those skilled in the art that a combination of two or more catalysts may be suitably used.

The choice of particulate, non-cellular filler material for use in the first stream of the present process is not particularly restricted provided that the filler material (directly or indirectly) does not substantially poison the polycondensation reaction. Non-limiting examples of filler material include minerals, ores, synthetic materials (both organic and polymeric), and the like. The process is particularly well suited for use with a filler material selected from the group comprising post-consumer and post-user articles—in this scenario these articles may be effectively recycled using the present process. Non-limiting examples of such articles include plastics, tires, and isocyanate-based foams and elastomers (filled and unfilled). Typically the filler material will be used in a particulate form and will have a suitable shape (e.g. microspherical, etc.). The choice of filler material may be dictated by the desired properties of or intended application for the foamed product; for example, as follows:

| Filler Material | Application/Property Conferred To Foam |
| --- | --- |
| 1. Fibrous | Porous, breathability, tear, special effects |
| 2. Expandable beads | Flotation, energy management |
| 3. Metallized fibres/powders | Conductivity |
| 4. Carbon black coated flakes/powders | Conductivity |
| 5. Microwave sensitive powders | Thermoformability |
| 6. Metallic fillers | Conductivity |
| 7. Heavy fillers | Sound attenuation |
| 8. Organic salts | Mold releasing |
| 9. Thermosensitive fillers | Thermoformability |

The second stream comprises an active hydrogen-containing compound and the remainder of the amount of water and the amount of catalyst based on the initial design referred to hereinabove. Thus, the sum of the amount of the water used in the first stream and the second stream is equal to the amount of water required according to the initial design. Similarly, the sum of the amount of the catalyst used in the first stream and the second stream is equal to the amount of catalyst required according to the initial design. Of course, those of skill in the art will understand that the second stream and the third stream will be designed to produce a foamed isocyanate-based polymer.

If the process is utilized to produce a polyurethane foam, the active hydrogen-containing compound is typically a polyol. The choice of polyol is not particularly restricted and is within the purview of a person skilled in the art. For example, the polyol may be a hydroxyl-terminated backbone of a member selected from the group comprising polyether, polyester, polycarbonate, polydiene and polycaprolactone. Preferably, the polyol is selected from the group comprising hydroxyl-terminated polyhydrocarbons, hydroxyl-terminated polyformals, fatty acid triglycerides, hydroxyl-terminated polyester, hydroxymethyl-terminated polyesters, hydroxymethyl-terminated perfluoromethylenes, polyalkyleneether glycols, polyalkylenearyleneether glycols and polyalkyleneether triols. More preferred polyols are selected from the group comprising adipic acid-ethylene glycol polyester, poly(butylene glycol), poly(propylene glycol) and hydroxyl-terminated polybutadiene—see, for example, British patent No. 1,482,213, the contents of which are incorporated herein by reference. The most preferred polyol is a polyether polyol. Preferably, such a polyether polyol has a molecular weight in the range of from about 200 to about 10,000, more preferably from about 2,000 to about 7,000, most preferably from about 2,000 to about 6,000.

If the process is utilized to produce a polyurea foam, the active hydrogen-containing compound comprises compounds wherein hydrogen is bonded to nitrogen. Preferably such compounds are selected from the group comprising polyamines, polyamides, polyimines and polyolamines, more preferably polyamines. Non-limiting examples of such compounds include primary and secondary amine terminated polyethers. Preferably such polyethers have a molecular weight of greater than about 1500, a functionality of from 2 to 6, and an amine equivalent weight of from about 200 to about 6000. Such amine terminated polyethers are typically made from an appropriate initiator to which a lower alkylene (e.g. ethylene, propylene, butylene and mixtures thereof) oxide is added with the resulting hydroxyl terminated polyol being subsequently aminated. If two or more alkylene oxides are used, they may be present either as random mixtures or as blocks of one or the other polyether. For case of amination, it is especially preferred that the hydroxyl groups of the polyol be essentially all secondary hydroxyl groups. Typically, the amination step replaces the majority but not all of the hydroxyl groups of the polyol.

The third stream in the present process comprises an isocyanate.

The isocyanate suitable for use in the third stream is not particularly restricted and the choice thereof is within the purview of a person skilled in the art. Generally, the isocyanate compound suitable for use may be represented by the general formula:

Q(NCO)$_i$ wherein i is an integer of two or more and Q is an organic radical having the valence of i. Q may be a substituted or unsubstituted hydrocarbon group (e.g. an alkylene or arylene group). Moreover, Q may be represented by the general formula:

Q$^1$—Z—Q$^1$ wherein Q$^1$ is an alkylene or arylene group and Z is chosen from the group comprising —O—, —O—Q$^1$—, —CO—, —S—, —S—Q$^1$—S— and —SO$_2$—. Examples of isocyanate compounds which fall within the scope of this definition include hexamethylene diisocyanate, 1,8-diisocyanato-p-methane, xylyl diisocyanate, (OCNCH$_2$CH$_2$CH$_2$OCH$_2$O)$_2$, 1-methyl-2,4-diisocyanatocyclohexane, phenylene diisocyanates, tolylene diisocyanates, chlorophenylene diisocyanates, diphenylmethane-4,4'-diisocyanate, naphthalene-1,5-diisocyanate, triphenylmethane-4,4',4"-triisocyanate and isopropylbenzene-alpha-4-diisocyanate.

In another embodiment, Q may also represent a polyurethane radical having a valence of i. In this case Q(NCO)$_i$ is a compound which is commonly referred to in the art as a prepolymer. Generally, a prepolymer may be prepared by reacting a stoichiometric excess of an isocyanate compound (as defined hereinabove) with an active hydrogen-containing compound (as defined hereinafter), preferably the polyhydroxyl-containing materials or polyols described below. In this embodiment, the polyisocyanate may be, for example, used in proportions of from about 30 percent to about 200 percent stoichiometric excess with respect to the proportion of hydroxyl in the polyol. Since the process of the present invention relates to the production of polyurea foams, it will be appreciated that in this embodiment, the prepolymer would be used to prepare a polyurethane modified polyurea (i.e. not an unmodified polyurethane) foam.

In another embodiment, the isocyanate compound suitable for use in the process of the present invention may be selected from dimers and trimers of isocyanates and diisocyanates, and from polymeric diisocyanates having the general formula:

[Q"(NCO)$_i$]$_j$ wherein both i and j are integers having a value of 2 or more, and Q" is a polyfunctional organic radical, and/or, as additional components in the reaction mixture, compounds having the general formula:

L(NCO)$_i$ wherein i is an integer having a value of 1 or more and L is a monofunctional or polyfunctional atom or radical. Examples of isocyanate compounds which fall with the scope of this definition include ethylphosphonic diisocyanate, phenylphosphonic diisocyanate, compounds which contain a =Si—NCO group, isocyanate compounds derived from sulphonamides (QSO$_2$NCO), cyanic acid and thiocyanic acid.

See also for example, British patent No. 1,453,258, the contents of which arc incorporated herein by reference.

Non-limiting examples of suitable isocyanates include: 1,6-hexamethylene diisocyanate, 1,4-butylene diisocyanate, furfurylidene diisocyanate, 2,4-toluene diisocyanate, 2,6-toluene diisocyanate, 2,4'-diphenylmethane diisocyanate, 4,4'-diphenylmethane diisocyanate, 4,4'-diphenylpropane diisocyanate, 4,4'-diphenyl-3,3'-dimethyl methane diisocyanate, 1,5-naphthalene diisocyanate, 1-methyl-2,4-diisocyanate-5-chlorobenzene, 2,4-diisocyanato-s-triazine, 1-methyl-2,4-diisocyanato cyclohexane, p-phenylene diisocyanate, m-phenylene diisocyanate, 1,4-naphthalene diisocyanate, dianisidine diisocyanate, bitolylene diisocyanate, 1,4-xylylene diisocyanate, 1,3-xylylene diisocyanate, bis-(4-isocyanatophenyl)methane, bis-(3-methyl-4-isocyanatophenyl)methane polymethylene polyphenyl polyisocyanates and mixtures thereof. A more preferred isocyanate is selected from the group comprising 2,4-toluene diisocyanate, 2,6-toluene diisocyanate and mixtures thereof, for example, a mixture comprising from about 75 to about 85 percent by weight 2,4-toluene diisocyanate and from about 15 to about 25 percent by weight 2,6-toluene diisocyanate. Another more preferred isocyanate is selected from the group comprising 2,4'-diphenylmethane diisocyanate, 4,4'-diphenylmethane diisocyanate and mixtures thereof. The most preferred isocyanate is a mixture comprising from about 15 to about 25 percent by weight 2,4'-diphenylmethane diisocyanate and from about 75 to about 85 percent by weight 4,4'-diphenylmethane diisocyanate. An example of such an isocyanate is commercially available from Imperial Chemical Industries under the tradename Rubinate M and from The Dow Chemical Company under the tradename PAPI 4027.

It is known in the art that the amount of water used as a blowing agent in the preparation of a foamed isocyanate-based polymer is conventionally in the range of from about 0.5 to as high as about 40 or more parts by weight, preferably from about 1.0 to about 10 parts by weight, based on 100 parts by weight of the total active hydrogen-containing compound content in the reaction mixture. Since the amount of water used in the production of a foamed isocyanate-based polymer is limited by the fixed properties expected in the foamed polymer and by the tolerance of the expanding foam towards self structure formation. It may be necessary, in certain circumstances, to utilize a substantially inert liquid extender when high loadings of filler material are contemplated. Non-limiting examples of suitable liquid extenders include halogenated hydrocarbons, high molecular weight hydrocarbons and polyols.

It is a key aspect of the present process that, in the first stream, the filler material acts as a carrier for a portion of the catalyst (and any other additives present) and a portion of the water so that these key components for polymerization (catalyst) and foaming (water) substantially surround the filler material. Specifically, it has been discovered that the use of the filler material as the carrier in this manner results in the ability to separate the prior art single step requirement for both (i) high mechanical mixing efficiency of the filler material with the conventional components; and (ii) the need to obtain intimate mixing (i.e. at the molecular level) of all components prior to completion of polymerization and foaming while, at the same, facilitating metering of the filler material to the mixing device. In the present process, the filler material is initially surrounded essentially by a portion of the water, a portion of the catalyst and, optionally, one or more other additives present—i.e. this is the first stream in the present process. The preparation of the first stream can be achieved using, in combination, a conventional solids mixer, a hopper and a solids metering device.

The first stream, second stream and third stream are independently fed to a mixing device wherein they are mixed. Preferably, the mixing device is a low pressure mixer equipped with a mechanical stirrer. Such a mixer is commercially available from Edge Sweets Corporation. Of course, the choice of mixing device is not particularly restricted and can include, for example, a high pressure (i.e. impingement) mixer. Mixing of the first stream, second stream and third stream in the mixing devices results in immediate initiation of polymerization and foaming of the reaction mixture. The result is a process which has a wide processing latitude and is quite versatile. Each of the three streams fed to the mixing device can be handled relatively easily and the requirement for accurate metering of the solids stream (i.e. the first stream) is mitigated. The provision of additives on the outer surface of the individual particles of filler material maximizes the intimate and uniform (both chemical and physical) incorporation of the filler material into the polymer matrix.

It is another key aspect of the present process that the first stream be in the form of a substantially free-flowing, solid (powder or particles). The intent is to achieve mixing of the filler material with a portion of the water and the catalyst to obtain a coating of the water and the catalyst on the surface of the filler material while maintaining the free-flowing nature of the filler material. This minimizes or eliminates the possibility of agglomeration of filler particles or, at the opposite extreme, the occurrence of wet spots.

While not wishing to be bound by any specific theory of mode of action, it is believed that the present process allows for reduction or elimination of various of the process limitations of prior art processes for introducing filler materials into isocyanate-based foams. Specifically, the major reactants in the polymerization reaction are the isocyanate and the active hydrogen-containing compound. For these reactants to react to any appreciable degree at ambient or processable temperatures and conditions, a catalyst is required. When such a catalyst is added, polymerization and foaming (if a blowing agent is present) occur together with a concurrent increase in viscosity of the reaction mixture. By provision of a first stream, a second stream and a third stream as described hereinabove and feeding these streams independently to a mixing device, thorough mixing of the three streams can be achieved using relatively low pressure, conventional equipment. In other words, wetting of the filler material surfaces with only a portion of the water and the catalyst ensures that the surface of the filler material serves as the site for polymerization and foaming of the reaction mixture while accurate metering of the filler material is mitigated by virtue of the fact the remaining portion of the water and the catalyst are dispersed in the second stream. This results in a particularly strong physical bond between the filler and the nascent polymeric matrix, while minimizing damage to the foam structure.

Further, the fact that the filler material acts as a "carrier" for a portion of the water and catalyst results in the ability of each filler material particle to have formed around it a layer of foamed polymer and for self location of the so coated filler material within the reacting, foaming mass. This reduces the amount of mechanical agitation which must be added to the system to distribute the filler material and allows for the use of conventional mixing equipment. The result of this reduction in the amount of mechanical agitation needed is an overall lowering of the free energy in the system which minimizes the occurrence of overheating of the reaction mass and the resultant property changes associated therewith. Furthermore, the location of the plateau borders of adjacent cells in a compact packing of the space around the filler particles or on the filler particle surface is believed to improve the loading bearing potential of the foamed polymer. Still further, the provision of the first mixture in the present process minimizes the occurrence of migration of fugitive components potentially associated with the filler.

As will be clearly understood by those of skill in the art, it is contemplated that conventional additives in the isocyanate-based polymer art be used in the process. Non-limiting examples of such additives include: surfactants (e.g. organo-silicone compounds available under the tradename L-540 Union Carbide or DC 5043 from Air Products), cell openers (e.g. silicone oils), extenders (e.g. halogenated paraffins commercially available as Coreclot S45), cross linkers (e.g. low molecular weight reactive hydrogen-containing compositions), pigments/dyes, flame retardants (e.g. halogenated organophosphoric acid compounds), inhibitors (e.g. weak acids), nucleating agents (e.g. diazo compounds), anti-oxidants, and plasticizers/stabilizers (e.g. sulphonated aromatic compounds). One or more of these additives may be used in the first stream or the second stream in the present process. The amounts of these additives conventionally used would be within the purview of a person skilled in the art.

With reference to the attached Figure, there is illustrated a schematic for a particularly preferred embodiment of the present process. In this embodiment, the present process is used to complement a conventional line for production of an untilled isocyanate-based foam.

Thus, a first holding tank 10 is provided and contains the active hydrogen-containing compound used in production of the isocyanate-based foam. Preferably, the active hydrogen-containing compound is formulated to contain at least a portion of the water, the catalyst and, optimally, other additives to be used in production of the foamed isocyanate-based polymer. A second holding tank 20 is provided and contains the isocyanate to be used in production of the isocyanate-based foam.

Active hydrogen-containing compound is withdrawn from first holding tank 10 by a tint pump 25 via a line 15. The active hydrogen-containing compound is fed to a high pressure mixhead 35 via a line 30. Isocyanate is withdrawn from second holding tank 20 by a second pump 45 via a line 40. The isocyanate is pumped to high pressure mixhead 35 via a line 50.

High pressure mixhead 35 includes two outlets. One outlet is connected to an line 55 and the other outlet is connected to a line 60. Line 55 is connected to an inlet to a low pressure mixhead 75 via a first low pressure directing valve 65 and a first low pressure recirculation valve 70. Line 60 is connected to another input in low pressure mixhead 75 via a second low pressure directing valve 80 and a second low pressure recirculation valve 85. Second low pressure recirculation valve 85 is connected to second low pressure directing valve 80 via a line 90 and to second holding tank 20 via a line 95. First low pressure directing valve 65 is connected to first holding link 10 via line 100. First low pressure recirculation valve 70 is connected to line 100 via a line 105. A mixing and coating tank 110 is provided and serves to contact the filler material, water and catalyst and, optimally, other additives that may be used in the production of the foamed isocyanate-based polymer. Mixing and coating tank 110 is connected to a hopper 120 via a line 115. Hopper 120 is connected to a solids feeder 130 via a line 125. Solids feeder 130 is connected to an input in low pressure mixhead 75 via a line 135. Low pressure mixhead 75 is provided with an impeller 140 or the like for mechanical mixing of the respective feeds from lines 55, 60 and 135.

As depicted, lines 30 and 55 are connected by a line 145 via a first high pressure recirculation valve 150. Further, lines 50 and 60 are connected by a line 155 via a second high pressure recirculation valve 160.

When it is desired to make a non-filled, foamed isocyanate-based polymer, active hydrogen-containing compound from first holding tank 10 is fed to high pressure mixhead 35 where it impinges on a similarly fed stream of isocyanate input from second holding tank 20. Thereafter, a liquid polymer composition 165 is dispensed from high pressure mixhead 35 into a mold 170 wherein the composition begins to expand and fill the mold. In this production scenario, substantially no reactants leave high pressure mixhead 35 via lines 55 and 60.

When it is desired to produce a filled, foamed isocyanate-based polymer, recirculation valves 150 and 160 are actuated to connect line 30 to line 55, and line 50 to line 60, respectively. It will be readily appreciated by those of skill in art that the function of valves 150 and 160 can be replaced by the stroked movement of the grooved clean-out piston in a conventional high pressure mixhead. The active hydrogen-containing compound is fed from line 55 to low pressure mixhead 75. The isocyanate is fed to low pressure mixhead 75 via line 60. The advantage of operating in this manner (i.e. is opposed to using a direct line from each of pumps 25 and 45 to low pressure mixhead 75) is that the accuracy of passing the active hydrogen-containing compound and the isocyanate results in very accurate metering of these reactants without potential damage to pumps 25 and 45. In low pressure mixhead 75, the active hydrogen-coaching compound from line 55, the isocyanate from line 60 and the mixed and coated filler material from line 135 are independently introduced and mixed therein with impeller 140. A foamable composition 175 is then dispensed from low pressure mixhead 75 into a mold 180 wherein the composition expands to fill mold 180.

Valves 65, 70, 80, 85; 150 and 160 are conventional three-way valves and the use thereof is within the purview of a person field in the an.

The embodiment of the present process depicted in the attached Figure is particularly advantageous since it allows the user to adapt a conventional high pressure line to include the present process. Further, it allows the user to alternate between producing a foamed isocyanate-based polymer which is non-filled or filled.

As will be apparent to those of skill in the art, the process of the present invention is useful in the production of slab foam, molded articles (e.g. automotive seat systems), and the like.

As will be appreciated by those of skill in the art, many variations of the disclosed process are possible without deviating from the spirit and substance thereof. Accordingly, while the invention has been described with reference to illustrative embodiments, the description is not intended to be construed in a limiting sense. Various modifications of the illustrative embodiments as well as other embodiments of the invention will be apparent to persons skilled in the art upon reference to this description. It is therefore contemplated that the appended claims will cover any such modifications or embodiments.

What is claimed is:

1. A system for producing a foamed isocyanate-based polymer, the system comprising a base line and a complementary line, the base line comprising a first mixing device operable in a first mode and a second mode and having an active hydrogen-containing compound input and an isocyanate input, the complementary line comprising a second mixing device having a filler material input, wherein in the first mode, the first mixing device receives a feed from the active hydrogen-containing compound input and the isocyanate input, mixes the feed to produce a first foamable polymeric composition and dispenses the first foamable polymeric composition in a first mold, and in the second mode, the first mixing device returns the feed, without mixing thereof, from the active hydrogen-containing compound input and the isocyanate input to the second mixing device which mixes the feed with feed from the filler material input to produce a second foamable polymeric composition and dispenses the second foamable polymeric composition in a second mold.

2. The system defined in claim 1, wherein in the second mode, the first mixing device redirects independent feed from each of the active hydrogen-containing compound input and the isocyanate input to the second mixing device.

3. The system defined in claim 1, wherein the first mixing device is a high pressure mixhead.

4. The system defined in claim 1, wherein the second mixing device is a low pressure mixhead.

5. The system defined in claim 1, wherein a first pump is used to provide feed from the active hydrogen-containing compound input and the isocyanate input to the first mixing device.

6. The system defined in claim 1, wherein in the second mode, the first pump is used to pump feed from the active hydrogen-containing compound input and the isocyanate input through the first mixing device to the second mixing device.

7. The system defined in claim 1, wherein the active hydrogen-containing compound input and isocyanate input are independent.

8. The system defined in claim 7, wherein a first pump is used to provide feed from the active hydrogen-containing compound input to the first mixing device and a second pump is used to provide feed from the isocyanate input to the first mixing device.

9. The system defined in claim 8, wherein in the second mode, the first pump is used to pump feed from the active hydrogen-containing compound input and second pump is used to pump feed from the isocyanate input through the first mixing device to the second mixing device.

10. The system defined in claim 1, wherein the filler material input comprises a mixing and coating device for mixing the filler material with at least one additive for use in production the isocyanate-based foam.

11. The system defined in claim 10, wherein the additive comprises water.

12. The system defined in claim 10, wherein the additive comprises a catalyst.

13. The system defined in claim 10, wherein the additive comprises a mixture of water and a catalyst.

* * * * *